H. Wadsworth.
Wheel Cultivator.
N⁰ 93,374. Patented Aug. 3, 1869.

UNITED STATES PATENT OFFICE.

HENRY WADSWORTH, OF DUXBURY, MASSACHUSETTS.

IMPROVEMENT IN CULTIVATORS.

Specification forming part of Letters Patent No. 93,374, dated August 3, 1869.

*To all whom it may concern:*

Be it known that I, HENRY WADSWORTH, of Duxbury, of the county of Plymouth, in the State of Massachusetts, have invented certain new and useful Improvements in Cultivators or Horse-Hoes, of which the following is a specification.

My machine accommodates itself to every irregularity in the ground, may lift itself to clear a stone or the like, while the force is transmitted through the agency of an axle or frame supported on wheels. The construction and arrangement are peculiar and allow perfect adjustment of the depth to which the cultivator is intended to act, also the lifting and swinging of the cultivator by hand.

I will first describe what I consider the best means of carrying out my invention, and will afterward designate the point which I believe to be new therein.

The accompanying drawings form a part of this specification.

Figure 1:
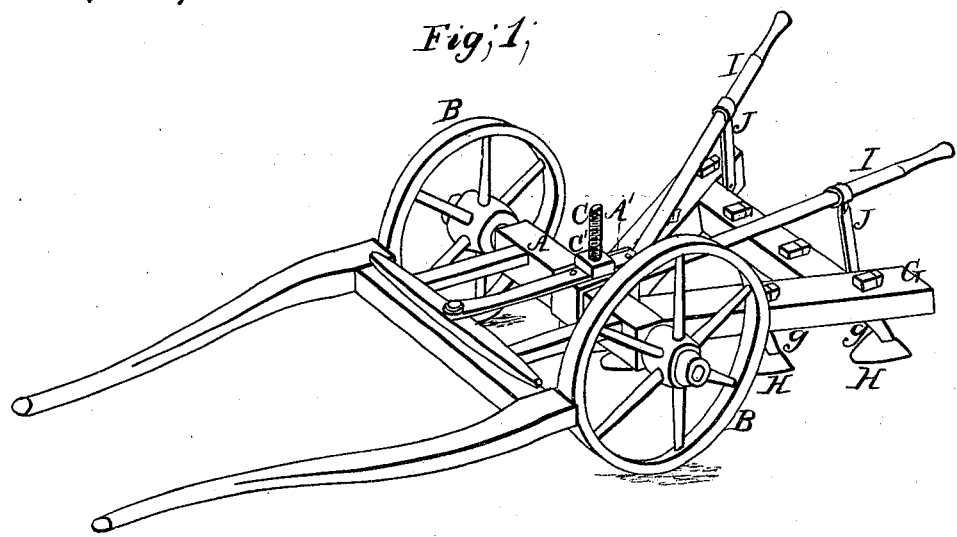
Figure 2:
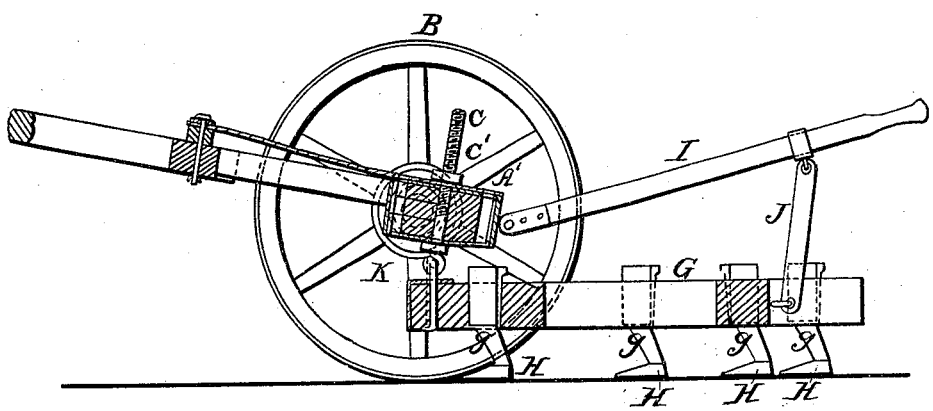

Figure 1 is a perspective view, and Fig. 2 a central longitudinal section.

In the second figure the cultivator is represented as being raised by the adjusting mechanism to its highest condition at the forward end. As thus adjusted the teeth will not penetrate in the earth at all, but will tend to slide along on the surface.

Similar letters of reference indicate like parts in all the figures.

A is an axle, provided with thills or other ordinary means for being drawn by a horse or other animal.

B B are wheels.

C is a vertical screw fitting loosely in a hole in the axle A, or in the connected block A', and provided with the adjustable nut C', by which the depth to which the screw may sink (or project below the axle) may be graduated at will. It is intended that the screw shall always project, under ordinary conditions, to a considerable depth below the axle; but in case of meeting with rocks, or any necessity therefor, the cultivator can be forced upward without lifting the axle and the connected parts. It does this by sliding the screw C longitudinally upward in the hole. The hole may be bushed with gas-pipe or other metal, to allow the screw to move upward freely. The screw need not be threaded the whole length, but only the upper half, or thereabout.

G is the frame, and $g$ the shanks of the teeth of a triangular cultivator. The frame and the connection of the teeth may be in any approved form; but I esteem it important that the teeth at their working part shall be shaped as represented, believing that they traverse through the soil more easily and pulverize it much better than any of the ordinary forms of cultivator-teeth.

The teeth are lettered H. It will be observed that their necks or shanks $g$ are sharpened at the front, and, instead of hooking forward, slant backward as they extend down; also that the necks $g$ are not widened. The teeth are flat at the base and extend out both forward and laterally from the necks and present a sharp cutting-edge, so as to separate the soil easily and lift it slightly without turning it over to any great extent. The ordinary teeth agitate the soil to a great extent—much more than I believe to be necessary—and they are more liable to accumulate rubbish or clog, while they at the same time draw harder or require the expenditure of more strength by the horse.

I I are handles, connected loosely by a suitable eye at the back of the axle or attached block, and connected loosely to the rear end of the cultivator by links J. These handles extend over the back far enough to be conveniently grasped by an attendant who walks behind. By their aid he may manage the cultivator in lifting it or swinging it about, in very much the same manner as the ordinary device for this purpose when it is used without wheels.

In operating under certain circumstances I wish the cultivator to act deeply in the soil. Under such circumstances I turn the nut C' so as to allow the forward end of the cultivator to be very much depressed. Under other circumstances, when I wish to cultivate less deeply, I turn the nut in the opposite direction and correspondingly gage the depth to which the front end of the cultivator may sink. The connection of the frame G to the bolt C is by a flexible eye, K, which allows it to turn in all directions and also tilt. I provide three or more holes, (each bushed or lined with metal, if desired,) in which the bolt C may be inserted. By this means the frame G may be adjusted forward or backward relatively to the wheels, according as the forward or rear hole is used.

It will be readily seen that my cultivator can, when desired, be used as an ordinary cultivator or harrow without the wheels; also, that the wheels may be adapted to serve in connection with other carriages when detached from the cultivator-frame and connecting-bolt.

Another advantage accruing from the form of the teeth represented is the leaving of the ground in a less heaped or ridged condition than the ordinary cultivators or horse-hoes.

I make the width of the thills at the front of the wheels sufficient to guard the corn or other plants cultivated from being struck by the wheels. They are bent outward by the thills, so that the wheels pass without touching.

I do not claim connecting cultivator-teeth with axles and wheels; nor do I claim any of the special devices, except when aggregated with others, as represented; but I believe I am the first to produce or suggest a device having the good qualities herein shown and described.

What I claim as my invention is—

The cultivator G $g$ H, connected to the single axle A by the universally-turning eye K and vertical sliding bolt C, adjustable by means of the nut C', or its equivalent, and provided with the handles I, or their equivalents, whereby it may be manipulated, all substantially in the manner and for the purpose herein set forth.

In testimony whereof I have hereunto set my name in presence of two subscribing witnesses.

HENRY WADSWORTH.

Witnesses:
BENJ. GOODSPEED,
H. E. SAMPSON.